June 3, 1924.  1,496,400

W. J. WISE ET AL

BEARING FOR HIGH SPEED MOTORS

Filed Sept. 13, 1921

Inventor

William J. Wise and
Thomas O. Adams

By Freast and Bond
Attorneys

Patented June 3, 1924.

1,496,400

UNITED STATES PATENT OFFICE.

WILLIAM J. WISE AND THOMAS O. ADAMS, OF NEW PHILADELPHIA, OHIO, ASSIGNORS TO THE WISE-McCLUNG MANUFACTURING COMPANY, OF NEW PHILADELPHIA, OHIO, A CORPORATION OF OHIO.

BEARING FOR HIGH-SPEED MOTORS.

Application filed September 13, 1921. Serial No. 500,464.

*To all whom it may concern:*

Be it known that we, WILLIAM J. WISE and THOMAS O. ADAMS, citizens of the United States, both residing at New Philadelphia, in the county of Tuscarawas and State of Ohio, have invented a new and useful Bearing for High-Speed Motors, of which the following is a specification.

This invention relates to motor bearings and is especially adapted for use upon the motors of suction cleaners, and has for its objects to provide a bearing which will properly lubricate the journals of the motor to permit of the excessive speed required of the motor in order to properly operate the suction fan.

The above and other objects may be attained by providing an annular groove in the periphery of the bearing, forming an oil or grease reservoir, and locating a wooden plug radially through the bearing forming communication between the oil reservoir and the journal, the heat generated in the bearing from the rapid rotation of the motor drawing the oil through the wooden plug from the reservoir to properly lubricate the journals of the motor.

A preferred embodiment of the invention thus set forth in general terms is illustrated in the accompanying drawing, in which—

Figure 1:
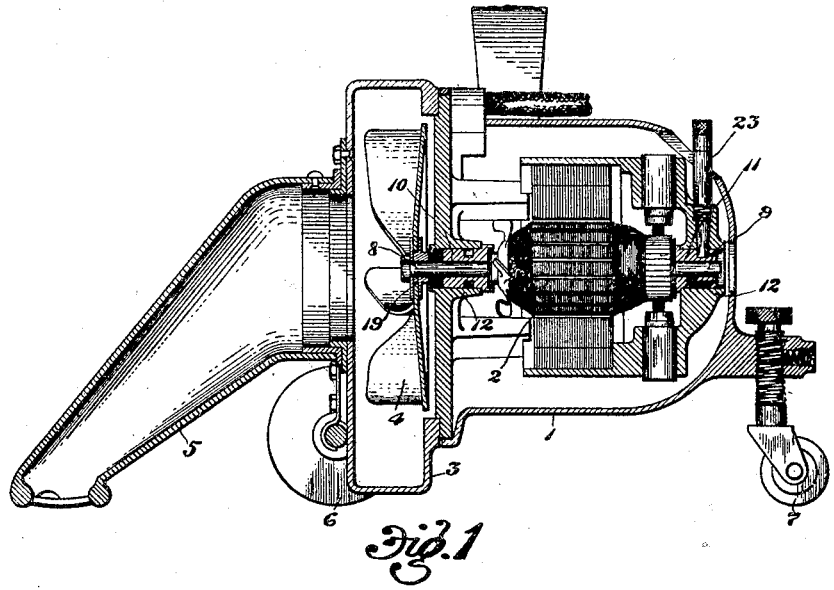
Figure 2:
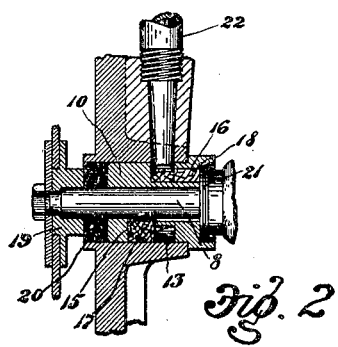
Figure 3:
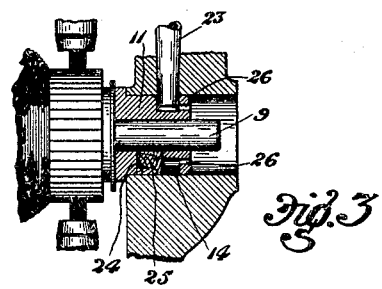
Figure 4:

Figure 1 is a longitudinal sectional view of a suction cleaner having a motor provided with bearings embodying the invention;

Fig. 2, an enlarged detail sectional view of the forward or lower bearing;

Fig. 3, a similar view of the rear or upper bearing;

Fig. 4, a detached perspective view of the bearing shown in Fig. 2; and

Figure 5:
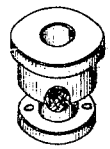

Fig. 5, a similar view of the bearing shown in Fig. 3.

Similar numerals of reference indicate corresponding parts throughout the several figures of the drawing.

Although the bearing is illustrated as applied to a horizontal motor, it will of course be understood that the same bearing is applicable to a vertical motor, without requiring any change in the construction or form of the bearing.

The suction cleaner illustrated is of the horizontal motor type, and comprises the usual motor casing 1 which contains the motor 2 of any approved type, the fan casing 3 which houses the rotary fan 4 and the nozzle 5 which communicates with the fan chamber, the device being supported upon the front wheels 6 and the rear wheel 7.

The forward and rear extremities of the armature shaft, which are designated by the numerals 8 and 9 respectively, are journaled in the bearings 10 and 11 respectively, each of these bearings being fixed within a suitable cylindric portion 12 of the motor frame.

These bearings are preferably of a die cast composition and each bearing is provided intermediate its extremities with a peripheral groove forming the oil reservoirs 13 and 14 respectively. The bearing 10 is provided with a transverse bore 15 communicating with the reservoir 13 and extending inwardly to the journal portion 8 of the armature shaft.

A longitudinal bore 16 extends from the reservoir 13 to the inner end of the bearing. A wooden plug 17 is placed in the bore 15 and a wooden plug 18 is placed in the bore 16.

The fan hub 19 is fixed to the inner end of the armature shaft and has an end thrust against the packing 20, the thrust collar 21 upon the armature shaft having an end thrust against the opposite end of the bearing 10.

An oil cup 22 extends through the motor casing and communicates with the reservoir 13 and a similar oil cup 23 communicates with the reservoir 14 of the bearing 11, thus providing means for supplying oil to the reservoirs of both of the bearings.

A transverse bore 24 is provided in the bearing 11 and communicates with the reservoir 14 and with the journal portion of the armature shaft, a wooden plug 25 being placed in said bore. Where the bearings are applied to a vertical motor, it may be preferable to oil the bearing 11 from the upper end, rather than by means of the oil cup 23, and for this purpose oil holes 26 may be provided in the outer end of the bearing.

The wooden plugs 17 and 25 contact with the oil reservoirs at one end and with the journal portions of the armature shaft at their opposite ends and the wooden plug 18 contacts with the reservoir 13 and with the thrust collar 21 upon the armature shaft.

The heat generated in the bearings from the excessive speed of the motor while in operation, draws the oil through these wooden plugs and supplies the journals with sufficient lubrication, while at the same time there is no danger of flooding the journals with oil.

We claim:

1. In a device of the character described, the combination of a metal bearing having a journal therein, and provided with a peripheral groove, a wooden plug extending transversely through the bearing and communicating at one end with the journal, one side only of the opposite end portion extending into said groove, and an oil cup communicating with said peripheral groove.

2. In a device of the character described, the combination of a metal bearing, a journal therein provided with a thrust collar, an oil reservoir in the bearing and a wooden plug extending through the bearing and communicating at opposite ends with the oil reservoir and the thrust collar.

3. In a device of the character described, the combination of a metal bearing and journal mounted therein and provided with a thrust collar engaging one end of the bearing, an annular groove in the bearing forming an oil reservoir, a wooden plug located transversely through the bearing communicating with the oil reservoir and contacting with the journal and a second wooden plug located longitudinally through the bearing communicating with the oil reservoir and contacting with the thrust collar.

In testimony that we claim the above, we have hereunto subscribed our names.

WILLIAM J. WISE.
THOMAS O. ADAMS.